United States Patent [19]

Sato et al.

[11] Patent Number: 4,682,214
[45] Date of Patent: Jul. 21, 1987

[54] TEST PATTERN PROJECTOR FOR A COLOR TELEVISION CAMERA

[75] Inventors: Kiyoshi Sato; Nobuo Matsui, both of Saitama, Japan

[73] Assignee: Fuji Photo Optical Co., Ltd., Saitama, Japan

[21] Appl. No.: 873,877

[22] Filed: Jun. 12, 1986

Related U.S. Application Data

[62] Division of Ser. No. 480,138, Mar. 29, 1983, abandoned.

[30] Foreign Application Priority Data

Mar. 29, 1982 [JP] Japan .................................. 57-48828
Jan. 22, 1983 [JP] Japan .................................. 58-9162

[51] Int. Cl.$^4$ .............................................. H04N 9/04
[52] U.S. Cl. ........................................ 358/55; 358/10; 362/324; 353/108; 353/102; 353/85
[58] Field of Search ...................... 358/10, 29, 41, 55; 353/84, 102, 122, 85, 108; 350/96.24, 96.25, 313, 314, 316; 362/324, 351, 322, 323, 32

[56] References Cited

U.S. PATENT DOCUMENTS

| | | | |
|---|---|---|---|
| 663,536 | 12/1900 | Fox et al. ............................ | 350/314 |
| 1,292,074 | 1/1919 | Rosenbloom ...................... | 362/324 |
| 1,751,584 | 3/1930 | Hansell .............................. | 350/96.25 |
| 2,051,528 | 8/1936 | Nanfeldt ............................. | 353/85 |
| 2,238,008 | 4/1941 | Beck et al. ......................... | 353/102 |
| 2,384,578 | 9/1945 | Turner ................................ | 350/314 |
| 2,934,172 | 4/1960 | Christie ............................... | 350/314 |
| 3,636,365 | 1/1972 | Houston .............................. | 350/96.24 |
| 3,825,336 | 7/1974 | Reynolds ........................... | 350/96.24 |
| 3,982,825 | 9/1976 | Mitchell .............................. | 353/84 |
| 4,222,641 | 9/1980 | Stolov ................................. | 353/84 |
| 4,233,650 | 11/1980 | Hagner et al. ...................... | 362/322 |
| 4,237,475 | 12/1980 | Sekiguchi ............................ | 358/41 |
| 4,345,271 | 8/1982 | Sekiguchi ............................ | 358/10 |
| 4,425,599 | 1/1984 | Rieder et al. ....................... | 362/32 |

FOREIGN PATENT DOCUMENTS

2074339 10/1981 United Kingdom ............... 350/315

*Primary Examiner*—John W. Shepperd
*Attorney, Agent, or Firm*—Young & Thompson

[57] ABSTRACT

A test pattern projector built into a color television camera, for adjusting the camera to desired conditions in order to attain a favorable quality of image immediately before use. A test pattern chart is illuminated with an illuminating light of an adjusted color temperature, forming an image of the test pattern chart on an image pickup apparatus. The color temperature adjustment of illuminating light emitted from a light source is effected by using a color temperature conversion filter and a color compensating filter both disposed in front of the light source. An interference filter or an absorbing filter with a wedge shape in cross section can be employed as the color compensating filter. The color correction depends, in the former, on the inclination thereof relative to the optical axis and, in the latter, on the thickness thereof intersecting the optical path.

3 Claims, 14 Drawing Figures

TEST PATTERN PROJECTOR FOR A COLOR TELEVISION CAMERA

This application is a division, of application Ser. No. 480,138, filed 3/29/83, now abandoned.

BACKGROUND OF THE INVENTION

The present invention relates to a test pattern projector which is used to make adjustments of television cameras.

The color television camera in a television broadcasting studio requires adjusting operations in order to attain a favorable color image quality immediately before using. The adjusting operations are carried out by using a test pattern projector built into the camera. A test pattern chart of the transmission type or reflection type in the projector is illuminated so as to direct the image of the chart to an image pickup apparatus comprising a dichroic prism system and three camera tubes; and the color control unit (CCU) is adjusted according to observations of the image thus formed.

One of the known test pattern projectors which is disclosed in non-examined Japanese Patent Appln. Publ. No. 54-120529 comprises three variable brightness light sources, with red, green and blue filters associated with the respective light sources and an optical element for mixing the red, green and blue light passing through the respective filters. In this projector, the color temperature of the illuminating light for the test pattern chart can be adjusted to the color temperature of about 3,000° K of the illuminating light in broadcasting studio component ratio, by varying the intensity of the light sources through variable resistors connected with the respective light sources to regulate the component ratio of the red, green and blue light.

However it is difficult for the projector mentioned above to maintain a well-balanced component ratio of the illuminating light from said three sources, with the result that the adjustment of the color temperature of the illuminating light is too complicated. Moreover, when one of said three light sources is changed following a breakdown, a readjustment of color temperature must be made. In addition to this, the test pattern projector suffers from the further drawback that the illuminating light has differences in brightness for the center to the edge because of a scattered quantity distribution of light from the respective light source.

OBJECTS OF THE INVENTION

The principal object of the present invention is to provide a test pattern projector wherein the color temperature of the light source can be easily adjusted.

Another object of the present invention is to provide a test pattern projector which is simple in construction.

Still another object of the present invention is to provide a test pattern projector with a test pattern chart that is easily changeable.

A further object of the present invention is to provide a test pattern projector which is adapted to be foldable in two, in order to shorten its overall length, by using a flexible optical fiber bundle as a light transmitting member.

Finally, it is an object of this invention to provide a test pattern projector wherein a uniform illuminating light is applied to every part of the test pattern chart by using a parabolic shading compensating filter.

SUMMARY OF THE INVENTION

The objects mentioned above are attained, in accordance with the present invention, by disposing a color compensating filter and a color temperature conversion filter between a light source and a test pattern chart. Both of these filters are adapted to be displaced so as to change the thickness thereof in the direction of the optical path or the depth thereof interrupting the optical path when disposed at a pupil position of the optical system of a test pattern projector. The color temperature of illuminating light for the test pattern chart can be adjusted to a desired color temperature depending on the thickness or the depth.

In a preferred embodiment of the present invention, an illuminating light with an adjusted color temperature is diffused by an optical fiber bundle. The flexibility of the fiber bundle enables the test pattern projector to be folded so as to be efficiently accommodated to a television camera restricted in length. The diffused illumination light passes through a parabolic shading correction filter, providing a uniformly distributed quantity of light and illuminating throughout the test pattern chart with a uniform intensity of illumination. The test pattern charts are disposed on a rotatable disk so as selectively to locate a desired chart in the optical path by rotation of the disk. This makes the test pattern chart arrangement compact.

DETAILED DESCRIPTION OF THE INVENTION

Figure 1:
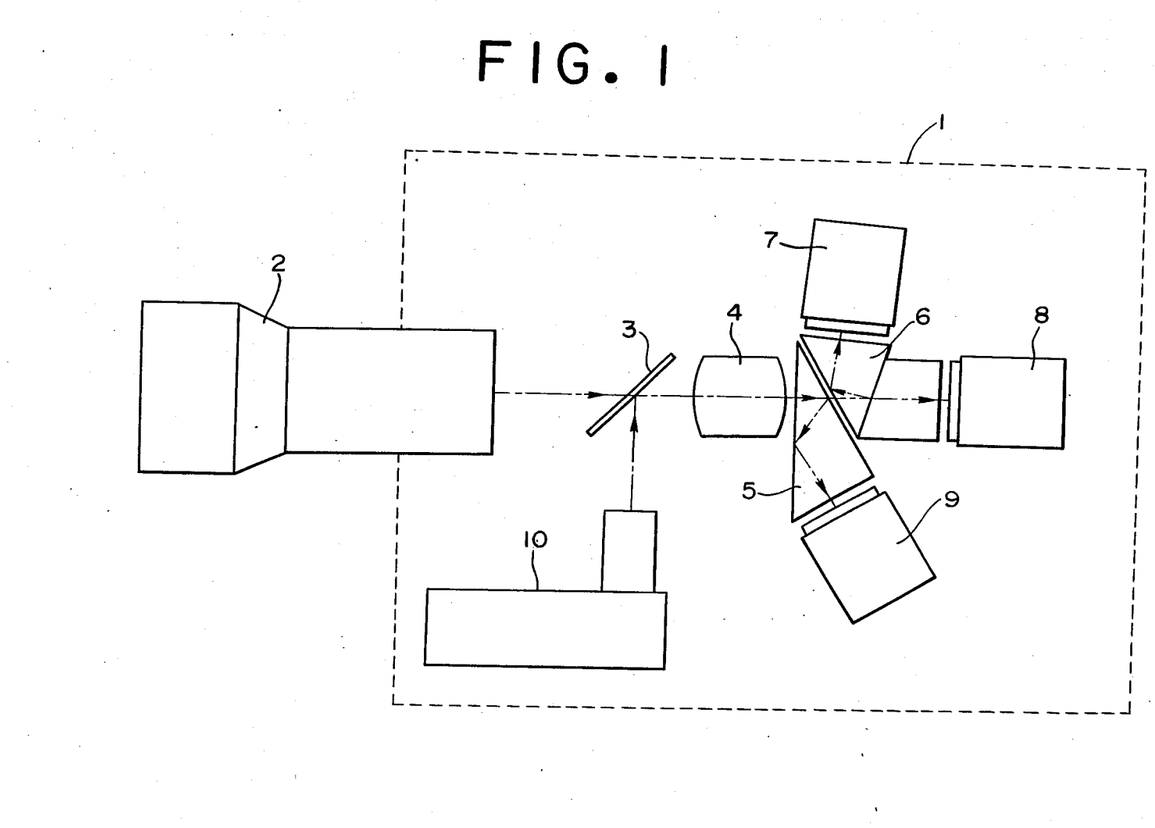
FIG. 1 is a diagrammatic illustration of an optical system in a television camera.

Now referring to FIG. 1 showing an optical system in a television camera, the television camera body 1 is provided with a zoom lens 2 through which light impinges on a partly reflective mirror 3. The light is separated into red, green and blue components by a three-color separating prism system 5, 6 after transmission through the partly reflective mirror 3 and a master lens 4. The separated components are focused on the face plates of camera tubes 7, 8 and 9 for red, green and blue, respectively.

In said television camera body 1 is disposed a test pattern projector 10, from which the emitted light is reflected by the partly reflective mirror 3 and directed to the master lens 4. When using the test pattern projector 10, it should be noted that a diaphragm of the zoom lens 2 is entirely stopped down so as to exclude the light passing through the zoom lens 2. Alternatively, exclusion may be achieved if a totally reflective mirror in place of the partly reflective mirror 3 is removably inserted into the optical path at an angle of 45° to reflect the light from the test pattern projector. The insertion of the totally reflective mirror into the optical path can be controlled by a power supply on-off switch (not shown) for the test pattern projector.

Figures 2, 3, 4:
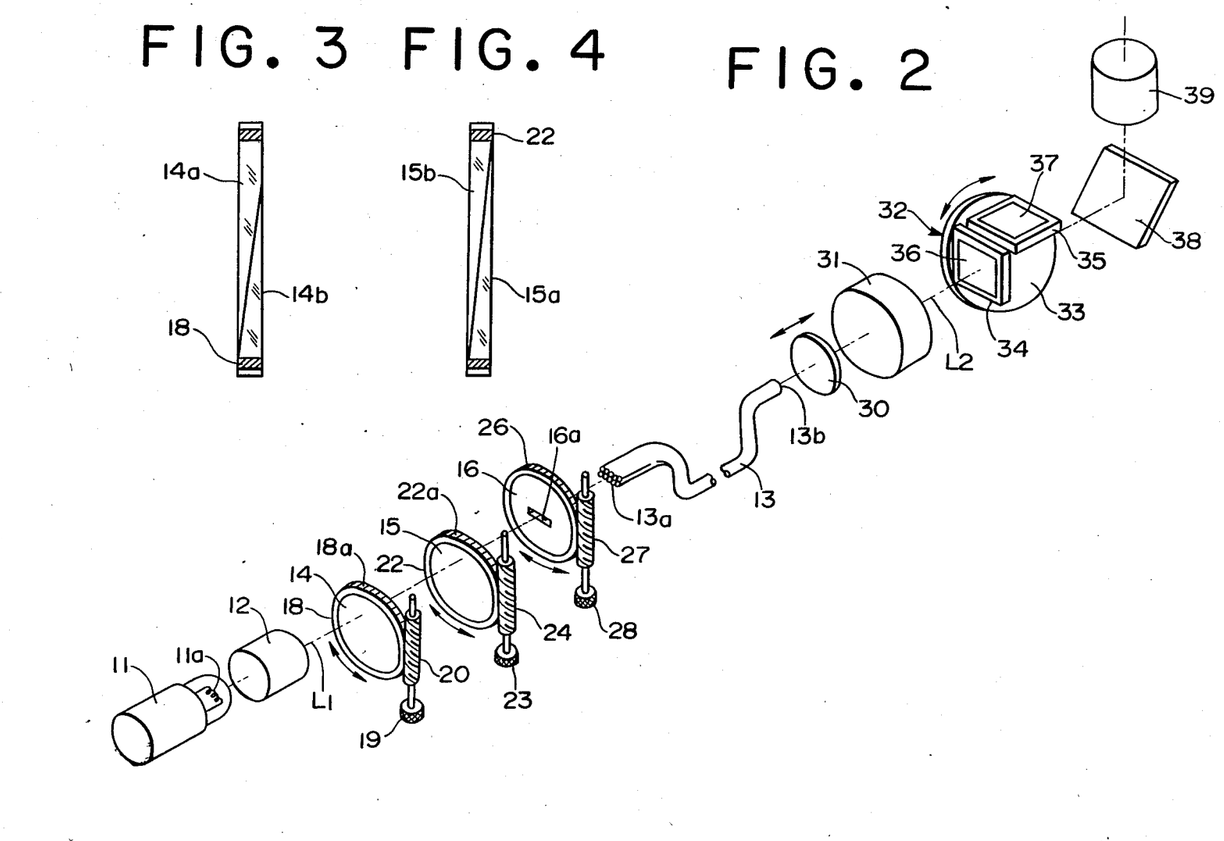
FIG. 2 is an exploded perspective diagrammatic illustration of an embodiment of the present invention.
FIG. 3 is a cross-sectional view of the color correction filter of FIG. 2.
FIG. 4 is a cross-sectional view of the filter for color temperature of FIG. 2, according to the present invention.

FIG. 2 is an exploded perspective view showing the construction of the test pattern projector wherein an illuminating light source 11 has a filament 11a extending in a direction perpendicular to the optical path L1 of the test pattern projector. A converging lens system 12 in front of the light source 11 focuses the image of the filament 11a on the light entry end 13a of diffusing means comprising an optical fiber bundle 13 comprising an extremely large number of flexible elongated optical fibers. The light entry end 13a has a rectangular shape extending in the same direction as the filament 11a and the light exit end 13b opposite the entry end has a round shape. Because of the flexibility of the optical fiber bundle 13, the test pattern projector 10 can be folded in two with the forward half thereof swung back, resulting in a folded test pattern projector usable in a compact television camera shortened in overall length.

Disposed adjacent the light entry end 13a of the optical fiber bundle 13 are a color compensating filter 14, a color temperature conversion filter 15 and a diaphragm 16, in that order. It should be noted that these elements are depicted spaced from the optical fiber bundle, for the purpose of clarity of illustration.

As shown in FIG. 3, the color compensating filter 14 which comprises a wedge-shaped transparent glass 14a and an evaporated layer 14b is supported by a circular holder 18 having worm gearing 18a therearound in mesh with a worm 20 rotatable through an operating knob 19. An M-50 filter (amethyst) marketed by Hoya Glass Co., Ltd. is an example of the color compensating filter 14.

Shown in FIG. 4 is the color temperature conversion filter 15 comprising a wedge-shaped transparent glass 15a and an evaporated film 15b which is supported by a circular holder 22 having worm gearing 22a therearound in mesh with a worm 24 rotatable through an operating knob 23. An LB-120 filter (blue) marketed by Hoya Glass Co., Ltd. is an example of the color temperature conversion filter 15. It should be noted that the common axis of rotation of the filters 14, 15 is spaced from and parallel to the optical axis.

The diaphragm 16 is an opaque disk with a slit 16a and has worm gearing 26 in mesh with a worm 27. The rotation of the worm 27 through an operating knob 28 causes the slit 16a to rotate, controlling the quantity of light passing through the slit 16a to the light entry end 13a of the optical fiber bundle 13.

The maximum angle of revolution is not permitted to exceed 180° for the filters 14 and 15 and 90° for the diaphragm 16.

The light from the exit end 13a which has a color temperature of 3,000° K equal to that of the illuminating light in a studio, is uniformly distributed in quantity by a parabolic shading compensating filter 30 disposed in the light path L2. The parabolic shading compensating filter 30 is of progressively reduced effect in a direction away from the center, so as to render uniform the distribution of light across the entire field and along the optical path L2.

The light passing through the parabolic shading compensating filter 30 then impinges on a test pattern chart arrangement 32 after passing through a converging lens system 31. The arrangement 32 comprises a rotatable disk 33, rectangular holders 34, 35 provided on the disk 33, and test pattern charts 36, 37 of the transmission type supported by the holders 34, 35 respectively. The test pattern charts 36, 37 are perpendicular to each other. Consequently, by a rotation of the disk 33 through an angle of 90° by remote operation, the test pattern charts are alternatively selected to be inserted in the optical path. There are various known kinds of test pattern charts for adjusting, for instance, registration, resolution, gradation, flare or the like. A composite test pattern chart may be one on which are depicted various kinds of test patterns usable if desired. These test pattern charts are quite conventional and as such form no part of the present invention.

The light from the test pattern chart 36 travels to partly reflective mirror 3 shown in FIG. 1 through a mirror 38 and an objective lens system 39.

Figure 5:
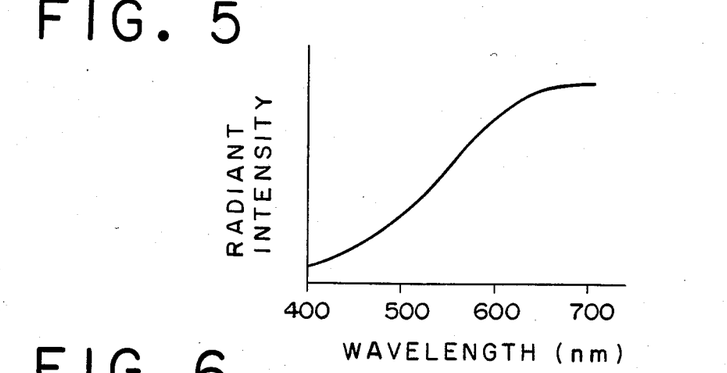
FIG. 5 is a graph of the spectral luminosity of the light source of FIG. 2.

FIG. 5 shows the spectral characteristics of a tungsten lamp used as the light source 11.

Figure 6:
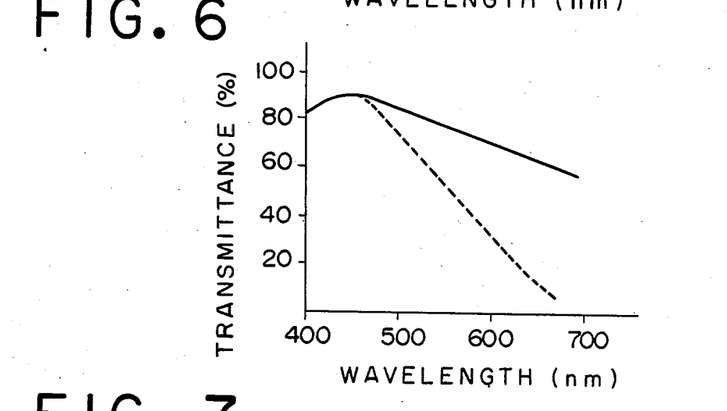
FIG. 6 is a graph of the spectral transmittance of the filter for color temperature of FIG. 2.

FIG. 6 is a graph of the spectral transmission of the color temperature conversion filter 15 wherein the curve shown with a dotted line is the spectral transmission of the filter 15 with a thick film and the other curve, shown with a solid line, is the spectral transmission of the filter 15 with a thin film.

Figure 7:
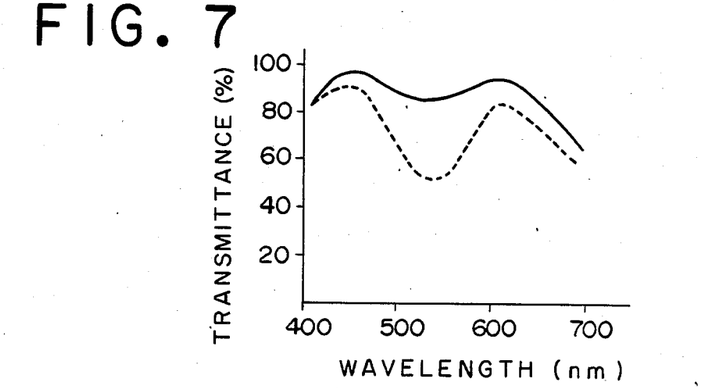
FIG. 7 is a graph of the spectral transmittance of the color correction filter of FIG. 2.

FIG. 7 is a graph of spectral transmission of the color compensating filter 14 wherein the curve shown with a dotted line is the spectral transmission of the filter 14 with a thick film and the other curve, the solid line, is for the filter 15 with a thin film.

The test pattern projector shown in FIG. 2, which is a preferred embodiment of the present invention, operates as follows:

Before using the television camera, the rotatable disk 33 is turned so as to position a selected test pattern chart in the optical path L2, thereby forming the image of this selected test pattern chart on the camera tube and adjusting the CCU so as to attain color images of a desired quality. During this adjustment, the diaphragm 16 is entirely stopped down so as to exclude light from the zoom lens 2.

After transporting the television camera, or after changing the light source, the color temperature of the illuminating light source for the test pattern chart should be adjusted by operating the color compensating filter 14, the color temperature conversion filter 15 and the diaphragm 16. At first, the spectral transmissions will be regulated as shown in FIG. 6 by independently rotating the color compensating filter 14 and the color temperature conversion filter 15 with the operating knobs 19, 23, respectively, so as to vary the thickness of each filter intersecting the optical path L1 in such a way that the outputs from the R, G and B channels of the image pickup apparatus are balanced with each other, while observing the wave forms on a well-known monitor (not shown). The outputs are then adjusted to an appropriate level (not instance 100%) following the balancing. The adjustment of the diaphragm 16 can be performed by operating the knob 28 to rotate the slit 16a so as to vary the amount of light passing therethrough.

By repeating the above-mentioned operation several times, the illumination with a desired color temperature (which color temperature can be adjusted, in this embodiment, within the range of 2,800-3,400° K) can be attained.

Figure 8:
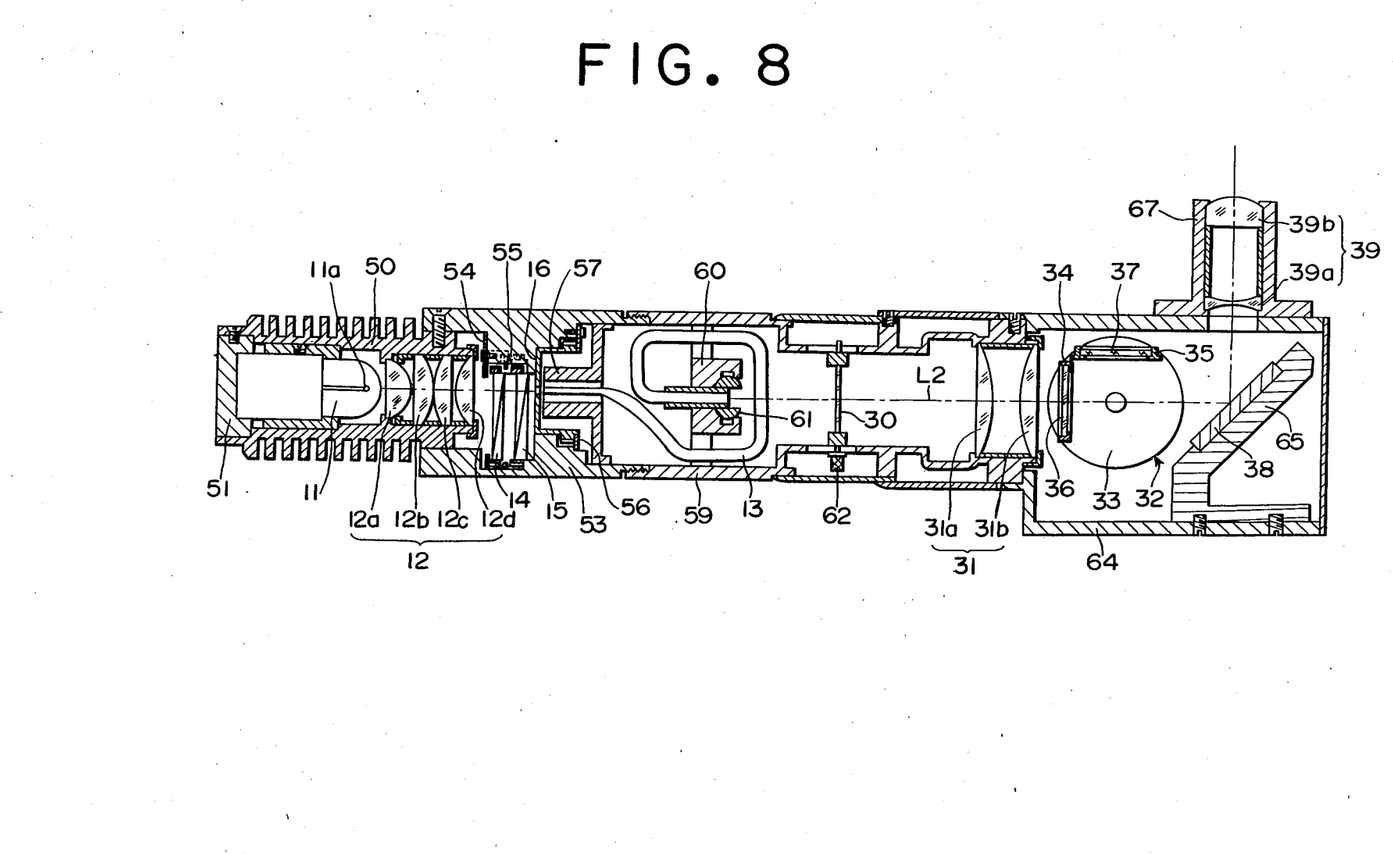
FIG. 8 is a cross-sectional view of the embodiment of FIG. 2.

In FIG. 8, showing the structure of the embodiment of FIG. 2, a housing 50 includes the light source 11 removable by detaching an end cover 51, and a converging lens system 12 comprising lenses 12a to 12d in front of the light source 11. Connected to the housing 50 is a first barrel 53 wherein the color compensating filter 14, the color temperature conversion filter 15 and the diaphragm 16 are rotatably mounted. Members designated by numerals 54, 55 and 56 are holders for rotatably supporting the color compensating filter 14, the color temperature conversion filter 15 and the diaphragm 16, respectively. The first barrel 53 at its front end further has a holder 57 for supporting the inlet end of the optical fiber bundle 13. The first barrel 53 is detachably secured to a second barrel 59 through a screw-threaded engagement. The test pattern projector can be folded in two by detaching the first barrel 53 and placing the detached first barrel 53 alongside the second barrel 59 for use in a television camera shortened in overall length. At the rear end of the second barrel 59 a holder 60 for supporting the outlet end of the optical fiber bundle 13 is provided. A ring designated by numeral 61 is for saw shading. Provided in the second barrel 59 are a converging lens system comprising lenses 31a and 31b and a parabolic shading correcting filter 30 which is movable along the optical path by manipulating a knob 62 thereon.

The second barrel 59 at its front end is provided with a housing 64 including the test pattern chart arrangement 32 and a mirror 38 on a support 65. The mirror 38 reflects light toward an objective lens system 39 comprising lenses 39a and 39b in another lens barrel 67.

Figure 9:
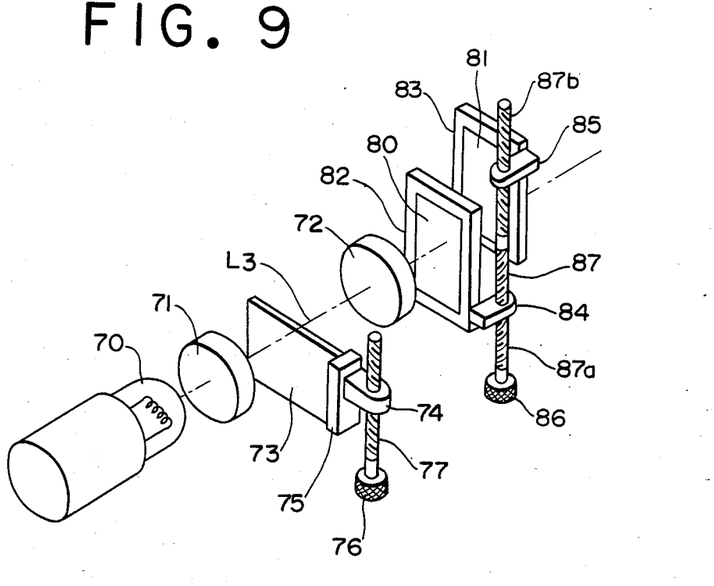
FIG. 9 is an exploded perspective diagrammatic illustration of the essential parts of another embodiment of the present invention.
Figure 10:
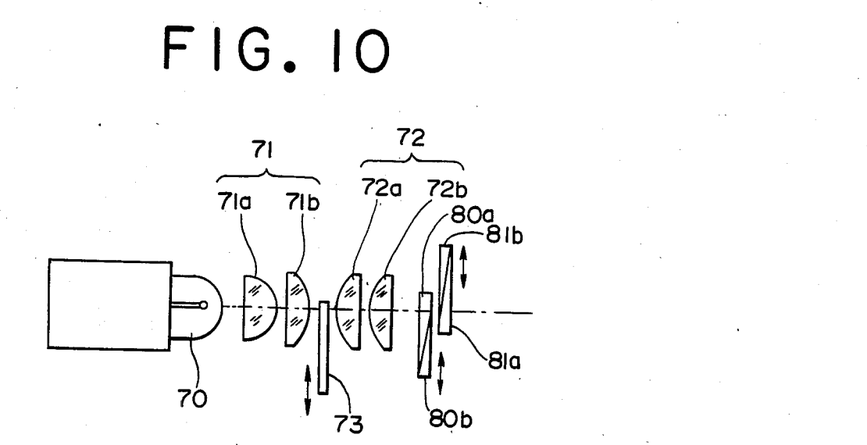
FIG. 10 is a diagrammatic view showing the optical train in the embodiment of FIG. 9.

FIGS. 9 and 10 show an embodiment of the essential mechanism by which the filters for color compensation and color temperature conversion are operated to slide in a direction perpendicular to the optical path. Forwardly of a light source 70, lens systems 71 and 72 are disposed in that order, and a color compensating filter 73 of uniform thickness is placed at the point of convergence between the lenses. The filter 73, supported by a holder 75 having a nut 74 engageable with a feed screw shaft 77 with a knob 76, is displaced in a direction perpendicular to the optical path L3 so as to control the green component of light according to the degree to which the filter 73 interrupts the optical path L3.

Adjacent the focal plane of the lens system 72 two color temperature conversion filters 80 and 81 having the said optical characteristics are disposed to overlap each other. The filters 80 and 81, which comprise wedge-like transparent glass 80a and 81a and wedge-like evaporated film 80b and 81b, respectively, are supported by respective holders 82 and 83 each having a rectangular shape. The holders 82 and 83 have nuts 84 and 85 engageable with a feed screw shaft 87 with opposite screw threads 87a and 87b. The rotation of the feed screw shaft 87 causes the filters 80 and 81 to move toward or away from each other so as gradually to vary the thickness of the filters in the optical path L3, thereby regulating the color temperature of the illuminating light. Although two color temperature conversion filters are used in this embodiment, a single color temperature conversion filter may suffice for performing this regulation.

Figure 11:
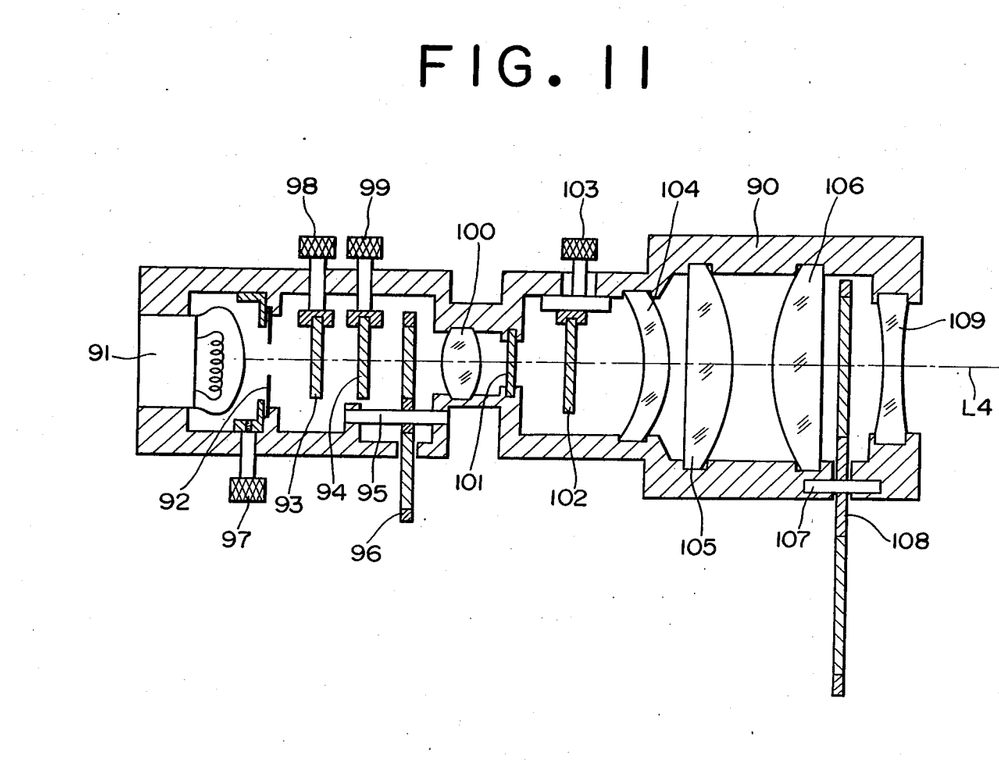
FIG. 11 is a cross-sectional view of still another embodiment of the present invention.

FIG. 11 shows another embodiment wherein a plurality of color temperature conversion filters having different characteristics provided on a turret disk, are selectively insertable in the optical path so as roughly to regulate the color temperature of the illuminating light; and two interference filters as color compensating filters in the optical path are independently inclined at various angles so as to regulate finely the color temperature of the illuminating light. In this embodiment, the illuminating light emitted from the light source 91 provided in housing 90 impinges on a rotatable disk 96 provided with filters after passing through a diaphragm 92, an interference filter 93 for blocking red light and then another interference filter 94 for blocking blue light. As is well known in the art, the diaphragm 92 is caused to vary its aperture size by swinging a knob 97 about the optical axis L4 so as to control the amount of light passing therethrough. On the other hand the interference filters 93 and 94 can be tilted to any desired angle relative to the optical axis L4 by rotating knobs 98 and 99 about their axes perpendicular to the optical axis L4, respectively, thereby to vary the thickness of the filter traversed by the light.

The illuminating light from one of the filters on the rotatable disk 96 impinges on a diffusing plate 101 after passing through a converging lens 100, and is thus diffused to be of uniform distribution. The diffused light further impinges on a parabolic shading compensating filter 102 which is of gradually reduced thickness in a direction away from the center and is displaced back and forth along the optical axis L4 by operating a knob 103 so as further to improve the uniformity of light distribution. The illuminating light passes through a meniscus lens 104 and condenser lenses 105 and 106 and illuminates one of the test pattern charts on a rotatable disk 108 and then emerges from the housing 90 through a concave lens 109.

Figure 12:
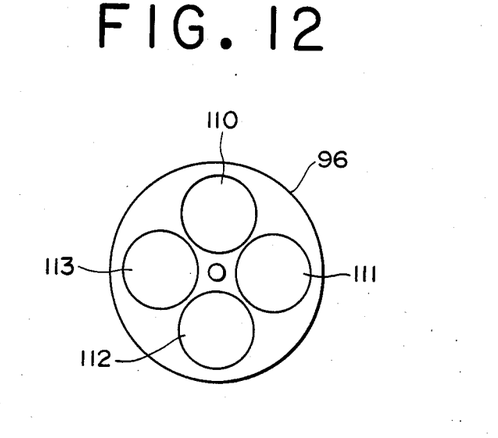
FIG. 12 is a front view of the rotatable filter disk of FIG. 11.

FIG. 12 shows an embodiment of the rotatable disk provided with filters wherein four color temperature conversion filters 110 to 113 differing in color temperature by increments of 50° K are arranged with proper separations. Any one of the color temperature conversion filters can be selected to be disposed in the optical path by the external operation of the rotatable disk 96. Although four color temperature conversion filters are shown arranged on the rotatable disk, the number of filters may be as needed.

Figure 13:
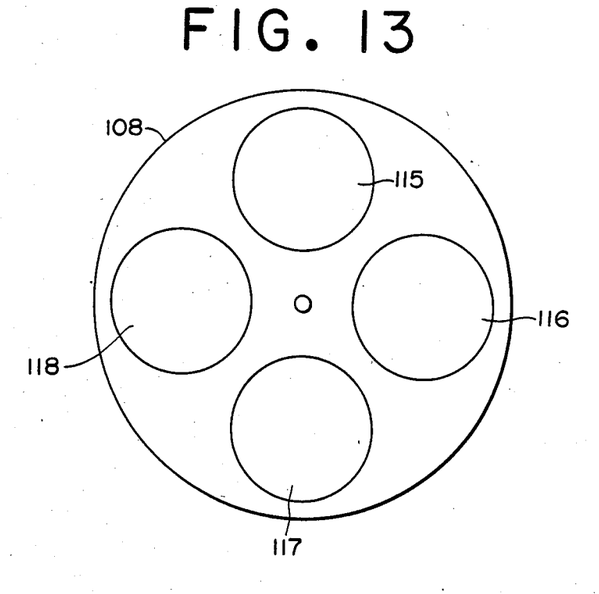
FIG. 13 is a front view of the rotatable chart disk of FIG. 11.

FIG. 13 shows an embodiment of the rotatable disk provided with test pattern charts wherein test pattern charts 115 to 118 for registration, resolution, gradation and flare are arranged with proper separations. Any one of the test pattern charts can be selected to be disposed in the optical path by the external operation of the rotatable disk 108. It is known to provide a composite test pattern chart including various test patterns on a chart for inspecting the respective control items. However, it is desirable to provide a single-purpose test pattern chart for the respective control item, because the deflection characteristics of the operating screw may be different depending on the location.

Figure 14:
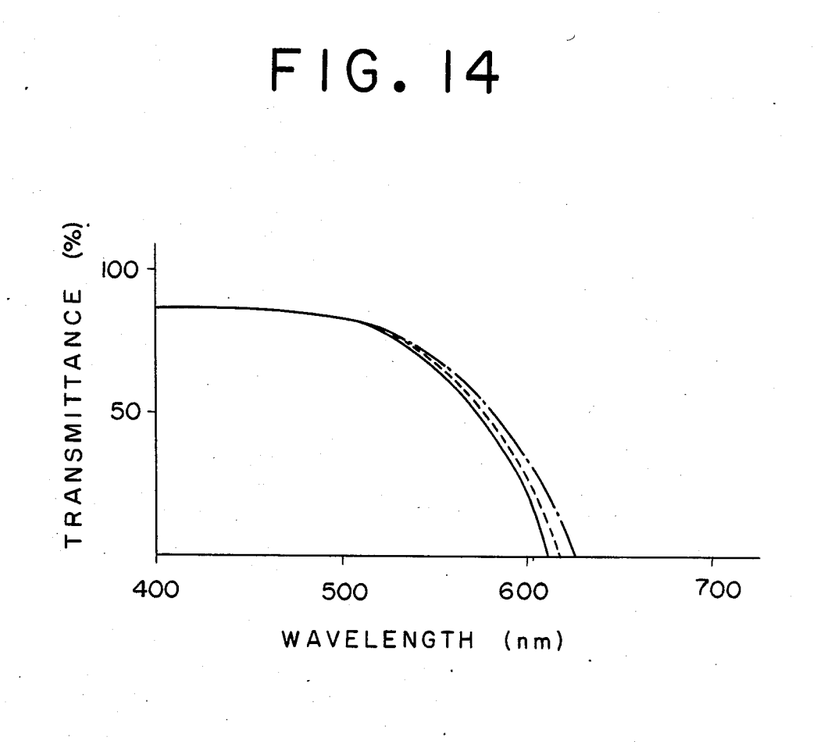
FIG. 14 is a graph of the light transmittance of the cut-off filter for red light of FIG. 11.

FIG. 14 shows the spectral characteristics of an interference filter for blocking red light. In the case of using an interference filter as the red color compensating filter 93, the wavelength range of illuminating light passed by the interference filter 93 is expanded as shown by the dotted line curve and the dot-dash curve with a substantial change of thickness of the interference film according to the inclination of the interference filter, resulting in increasing the red component of the illuminating light. In this way, the component ratio of red, green and blue light passing through the interference filters 93 and 94 can be finely adjusted to a selected color temperature by independently tilting the filters to change the thickness of the interference film along the optical axis.

The test pattern projector shown in FIG. 11 operates as follows:

First, a desired color temperature conversion filter is selected to be placed in position by a motor drive or an external manual operation, roughly regulating the color temperature of the illuminating light emitted from the light source 91. Then the color compensating filters or the interference filters 93 and 94 are independently changed in inclination by the operation of the knobs 98 and 99 so as to shift the range of wavelength of light passing therethrough, thereby finely adjusting the color temperature of the illuminating light for a selected test pattern chart, to the desired temperature.

What is claimed is:

1. In a color television camera, a test pattern projector comprising:
   a light source for emitting illuminating light;
   a first optical system for converging the illumination emitted from said light source;
   said light source having a filament that is elongated in a direction perpendicular to the optical axis of said first optical system;
   a diaphragm having a slot therethrough, said slot extending in a direction perpendicular to said optical axis and said optical axis passing through the midpoint of the length of the slot;
   means for rotating said diaphragm about said optical axis;
   means for diffusing the illuminating light passing through said slot;
   a parabolic shading compensating filter for making said diffused illumination light uniform in intensity, the light transmissivity of said filter progressively increasing in a direction away from the center thereof;
   test pattern charts to be illuminated by said diffused illuminating light; and
   a second optical system for forming an image of a selected said test pattern chart on an image pick-up apparatus.

2. A test pattern projector as defined in claim 1, said diffusing means comprising a bundle of optical fibers having an end adjacent said slot which lies on said optical axis and is elongated in a direction parallel to said filament, and an end remote from said slot which is adjacent said second optical system and is circular.

3. In a color television camera, a test pattern projector comprising:
   a light source for emitting illuminating light;
   a first optical system for converging the illumination emitted from said light source;
   a color compensating filter for the illuminating light disposed on the optical axis of said first optical system;
   at least one color temperature conversion filter for the illuminating light disposed on said optical axis of said first optical system, which is of progressively varying thickness;
   first means for displacing said color temperature conversion filter in a plane perpendicular to said optical axis of said first optical system to vary the thickness thereof along said optical axis;
   means for diffusing the illuminating light passing through said color temperature conversion filter and said color compensating filter;
   test pattern charts to be illuminated by said diffused illuminating light; and
   a second optical system for forming an image of a selected said test pattern chart on an image pickup apparatus, said color compensating filter and said color temperature conversion filter being mounted on a first barrel, said first barrel being detachably secured to a second barrel that carries said test pattern charts and said second optical system so as to permit detaching the first and second barrels from each other and folding the test pattern projector in two for use in a television camera shortened in overall length, said diffusing means flexibly interconnecting said first and second barrels and comprising a bundle of optical fibers, one end of said bundle of optical fibers being secured to said first barrel and the other end of said bundle of optical fibers being secured to said second barrel, the length of said bundle of fibers being substantially greater than the distance between said ends when said first and second barrel are secured to each other.

* * * * *